(12) United States Patent
Yoo et al.

(10) Patent No.: US 8,867,003 B2
(45) Date of Patent: Oct. 21, 2014

(54) LIQUID CRYSTAL DISPLAY DEVICE

(75) Inventors: Seung-hoo Yoo, Seongnam-si (KR);
Hee-wook Do, Cheonan-si (KR);
Mee-hye Jung, Suwon-si (KR);
Sung-hoon Yang, Yongin-si (KR);
Hyun-cheol Moon, Suwon-si (KR);
Hye-ran You, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 292 days.

(21) Appl. No.: 11/944,910

(22) Filed: Nov. 26, 2007

(65) Prior Publication Data

US 2008/0174708 A1 Jul. 24, 2008

(30) Foreign Application Priority Data

Nov. 28, 2006 (KR) .................. 10-2006-0118303

(51) Int. Cl.
*G02F 1/1343* (2006.01)
*G02F 1/1337* (2006.01)
*G02F 1/139* (2006.01)
*G02F 1/1362* (2006.01)

(52) U.S. Cl.
CPC ........ *G02F 1/1393* (2013.01); *G02F 1/133753* (2013.01); *G02F 1/134309* (2013.01); *G02F 2001/134318* (2013.01); *G02F 1/136213* (2013.01)
USPC ............................. 349/129; 349/39; 349/130

(58) Field of Classification Search
USPC ............................................ 349/129, 130, 39
See application file for complete search history.

(56) References Cited

U.S. PATENT DOCUMENTS

| 2005/0001973 | A1 | 1/2005 | Nakanishi et al. | |
| 2005/0110939 | A1* | 5/2005 | Wano | 349/178 |
| 2005/0122459 | A1* | 6/2005 | Song et al. | 349/139 |
| 2006/0227274 | A1* | 10/2006 | Do et al. | 349/139 |
| 2006/0262237 | A1 | 11/2006 | Chen et al. | |

FOREIGN PATENT DOCUMENTS

| JP | 2000-155317 | 6/2000 |
| JP | 2001-083522 | 3/2001 |
| JP | 2003-186029 | 7/2003 |
| JP | 2005-122167 | 5/2005 |
| JP | 2006-293366 | 10/2006 |
| KR | 10-2000-0023106 | 4/2000 |
| KR | 10-2003-0046918 | 6/2003 |
| KR | 10-2005-0068538 | 7/2005 |
| KR | 10-2006-0018399 | 3/2006 |
| KR | 10-2006-0018401 | 3/2006 |
| KR | 10-2006-0061490 | 6/2006 |

\* cited by examiner

*Primary Examiner* — Michael Caley
(74) *Attorney, Agent, or Firm* — H.C. Park & Associates, PLC

(57) ABSTRACT

A liquid crystal display device including a first substrate including a pixel electrode, a second substrate facing the first substrate and including a common electrode, and a liquid crystal layer interposed between the first substrate and the second substrate. The first substrate includes a storage capacitive line. The liquid crystal display device further includes a domain forming member that is formed over a first region corresponding to the storage capacitive line and a second region adjacent to the first region. The domain forming member is formed with irregular parts including a first irregular part having an enlarged width, a second irregular part having a reduced width, and an external irregular part, which is closest to the first region of the irregular parts formed in the second region and has an enlarged width.

26 Claims, 34 Drawing Sheets

US 8,867,003 B2

LIQUID CRYSTAL DISPLAY DEVICE

CROSS-REFERENCE TO RELATED APPLICATION

This application claims priority from and the benefit of Korean Patent Application No. 10-2006-0118303, filed on Nov. 28, 2006, which is hereby incorporated herein by reference for all purposes as if fully set forth herein.

BACKGROUND OF INVENTION

1. Field of the Invention

The present invention relates to a liquid crystal display device.

2. Discussion of the Background

A liquid crystal display device includes a first substrate on which thin film transistors are formed, a second substrate facing the first substrate, and a liquid crystal layer interposed therebetween.

Of display modes in which a liquid crystal display device displays an image, a patterned vertically aligned (PVA) mode is a VA mode where cutting patterns are formed in pixel electrodes and a common electrode to increase the viewing angle of the display. The viewing angle is increased by controlling the orientation of liquid crystal molecules using a fringe field formed by these cutting patterns.

In the PVA mode, the degree of retardation of light passing through the liquid crystal molecules varies greatly depending on the angle of observation. This may cause the brightness of a low gray scale to sharply increase when the display is viewed from the side, which may decrease visibility as well as the contrast ratio. To overcome this problem, a super-PVA (SPVA) mode has been developed, in which a pixel is divided into a plurality of sub domains to which different data voltages are applied.

However, instant after images may occur with both the PVA mode and the SPVA mode devices, thereby deteriorating image quality.

SUMMARY OF THE INVENTION

The present invention provides a liquid crystal display device that may reduce after images.

Additional features of the invention will be set forth in part in the description which follows and, in part will be apparent from the description, or may be learned by practice of the present invention.

The present invention discloses a liquid crystal display device including a first substrate including a pixel electrode, a second substrate that faces the first substrate and includes a common electrode, and a liquid crystal layer interposed between the first substrate and the second substrate. The first substrate includes a storage capacitive line. The liquid crystal display device further includes a domain forming member that is disposed over a first region corresponding to the storage capacitive line and a second region adjacent to the first region. The domain forming member has irregular parts including a first irregular part having an enlarged width, a second irregular part having a reduced width, and an external irregular part that is closest to the first region of the irregular parts disposed in the second region and has an enlarged width.

The present invention discloses a liquid crystal display device including a first substrate including a pixel electrode, a second substrate that faces the first substrate and includes a common electrode, and a liquid crystal layer that is interposed between the first substrate and the second substrate and has a vertically aligned (VA) mode. The common electrode has a common electrode cutting pattern and is disposed over a first region where a gap between the first substrate and the second substrate is different from adjacent regions and a second region adjacent to the first region. The common electrode cutting pattern has irregular parts including a first irregular part having an enlarged width, a second irregular part having a reduced width, and an external irregular part having an enlarged width. Of the irregular parts formed in the second region, the external irregular part is closest to the first region.

It is to be understood that both the foregoing and general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
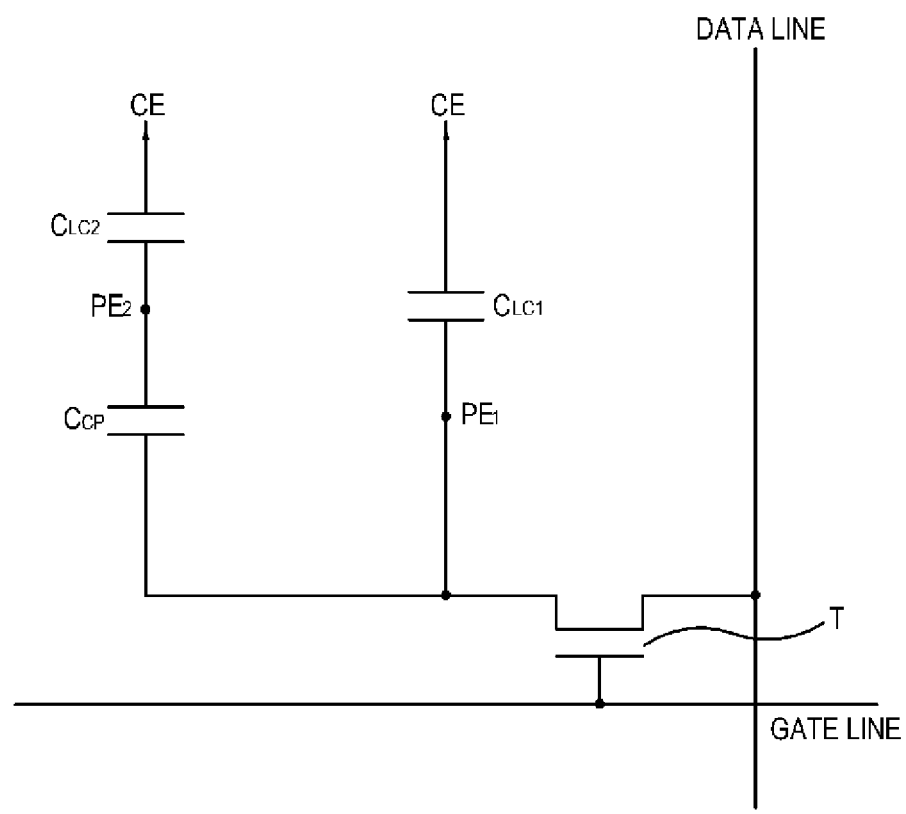
FIG. 1 is an equivalent circuit diagram of a liquid crystal display device according to a first exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an equivalent circuit diagram of a liquid crystal display device according to a first exemplary embodiment of the invention.

As shown in FIG. 1, first and second liquid crystal capacitors $C_{LC1}$ and $C_{LC2}$ are connected to a thin film transistor T. The first liquid crystal capacitor $C_{LC1}$ is formed between a first pixel electrode PE1 and a common electrode CE. The first pixel electrode PE1 is directly connected to the thin film transistor T. The second liquid crystal capacitor $C_{LC2}$ is formed between a second pixel electrode PE2 and the common electrode CE. The second pixel electrode PE2 is indirectly connected to the thin film transistor T via a coupling capacitor $C_{CP}$.

Here, the first pixel electrode PE1 is separated from the second pixel electrode PE2.

Figure 2:
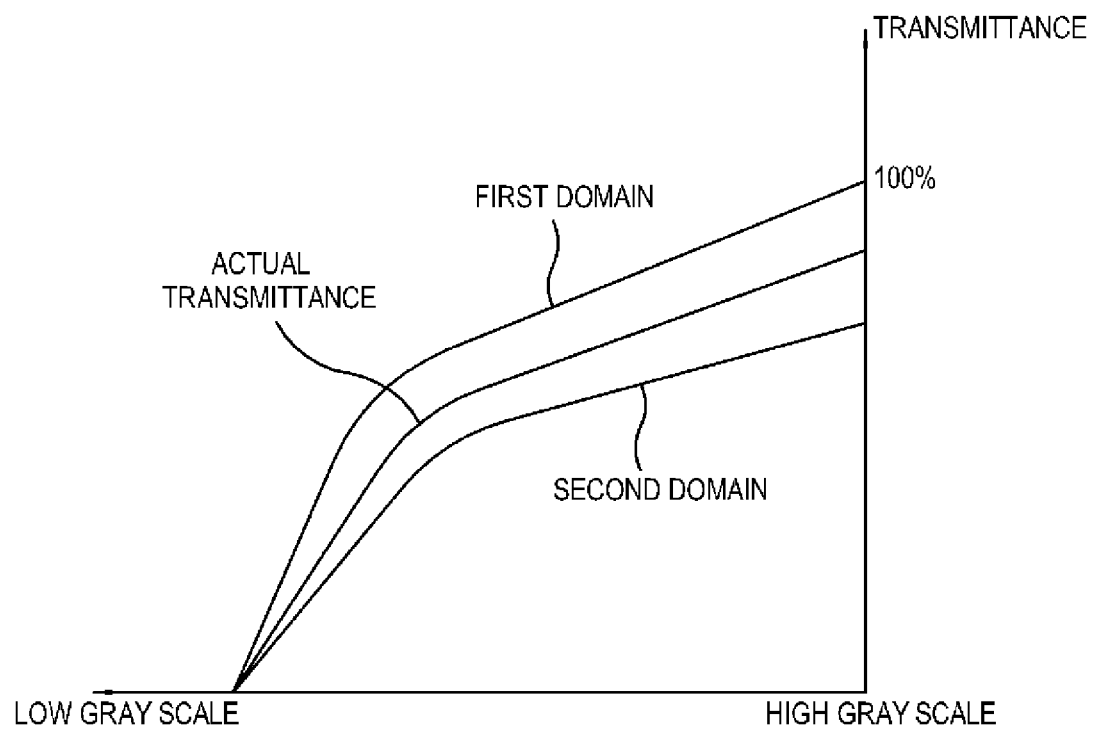
FIG. 2 is a view showing the principle of visibility improvement of the liquid crystal display device according to the first exemplary embodiment of the invention.
Figure 3:
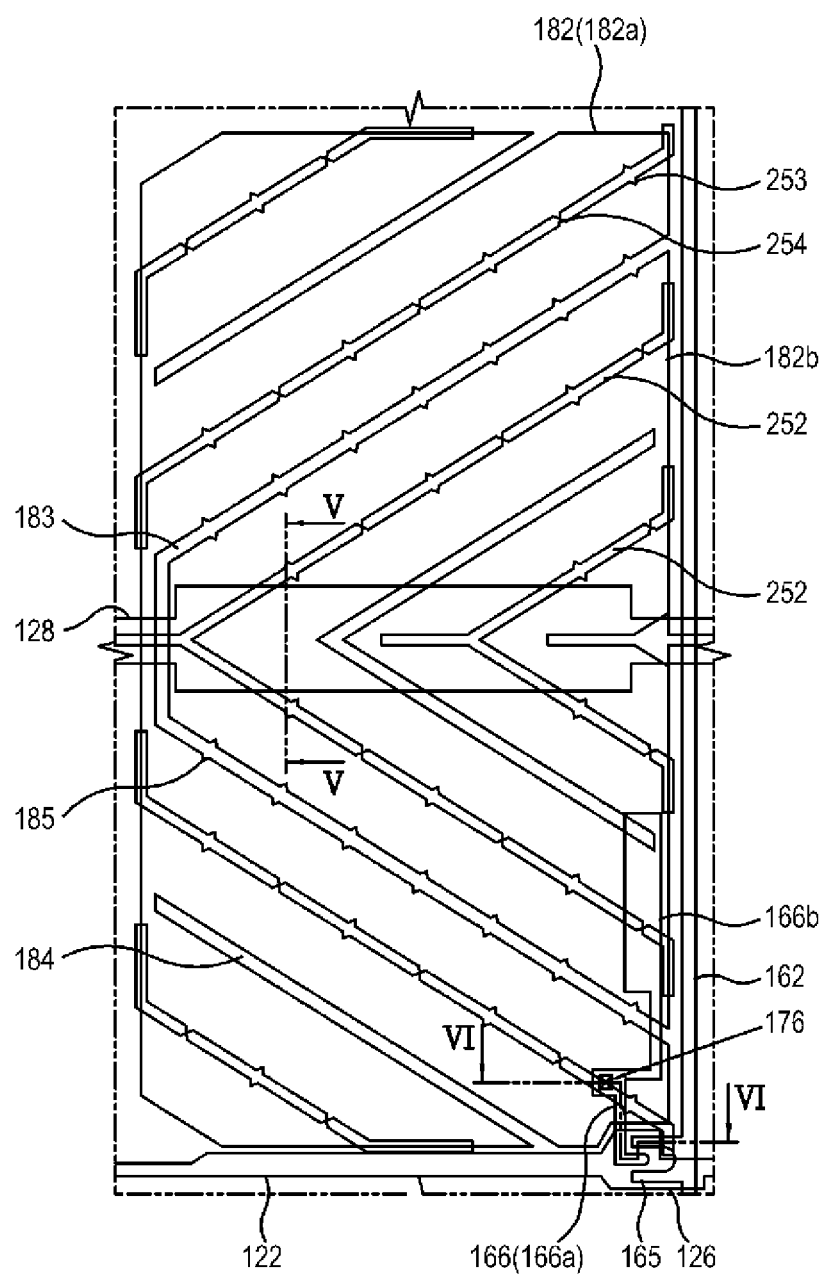
FIG. 3 and FIG. 4 show layouts of the liquid crystal display device according to the first exemplary embodiment of the invention.

Now, the reason visibility may be improved in the liquid crystal display device according to the first exemplary embodiment will be described with reference to FIG. 2.

A data signal from the thin film transistor T is directly applied to the first pixel electrode PE1, while a data signal from the thin film transistor T is indirectly applied to the second pixel electrode PE2 via the coupling capacitor $C_{CP}$. Accordingly, intensity of the applied data signal is weaker in the second pixel electrode PE2 than in the first pixel electrode PE1, thereby causing a difference in the brightness of a first domain corresponding to the first pixel electrode PE1 as compared to a second domain corresponding to the second pixel electrode PE2. Specifically, a voltage applied to the second pixel electrode PE2 may be 50% to 90% of a voltage applied to the first pixel electrode PE1.

In this manner, one pixel may have a plurality of domains having different gamma curves. This allows brightness and color in the front and side to compensate for each other, thereby improving lateral visibility.

Figure 4:
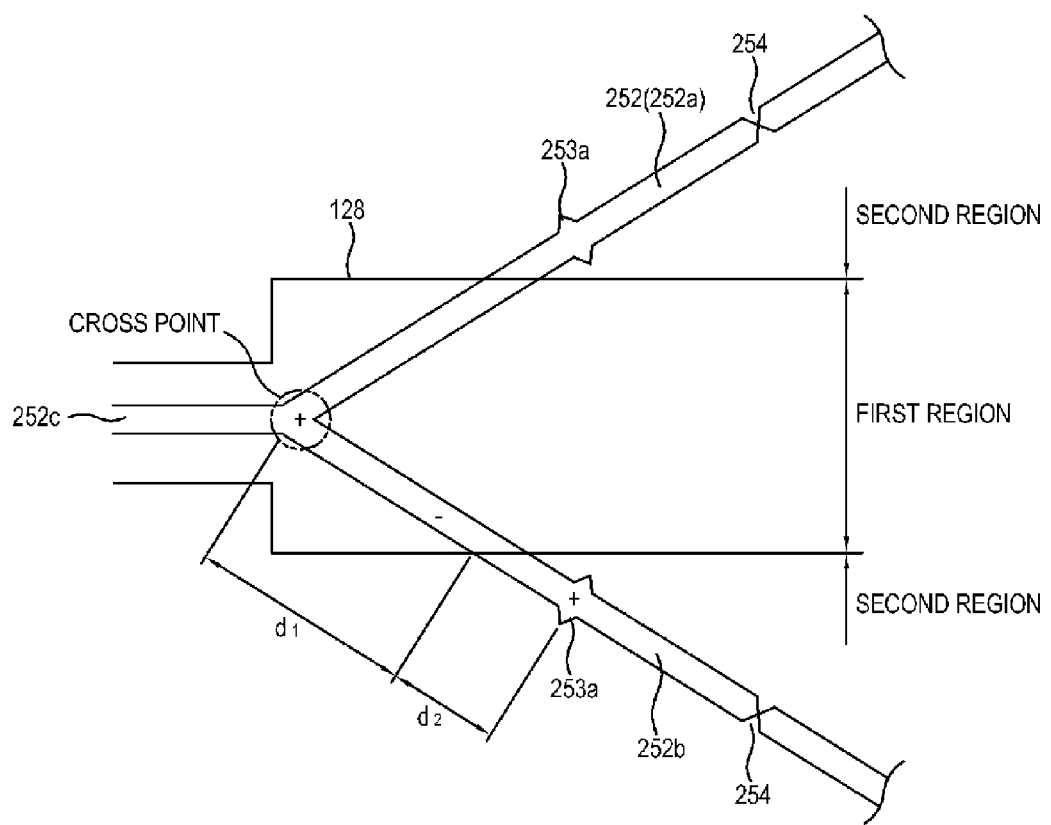
Figure 5:
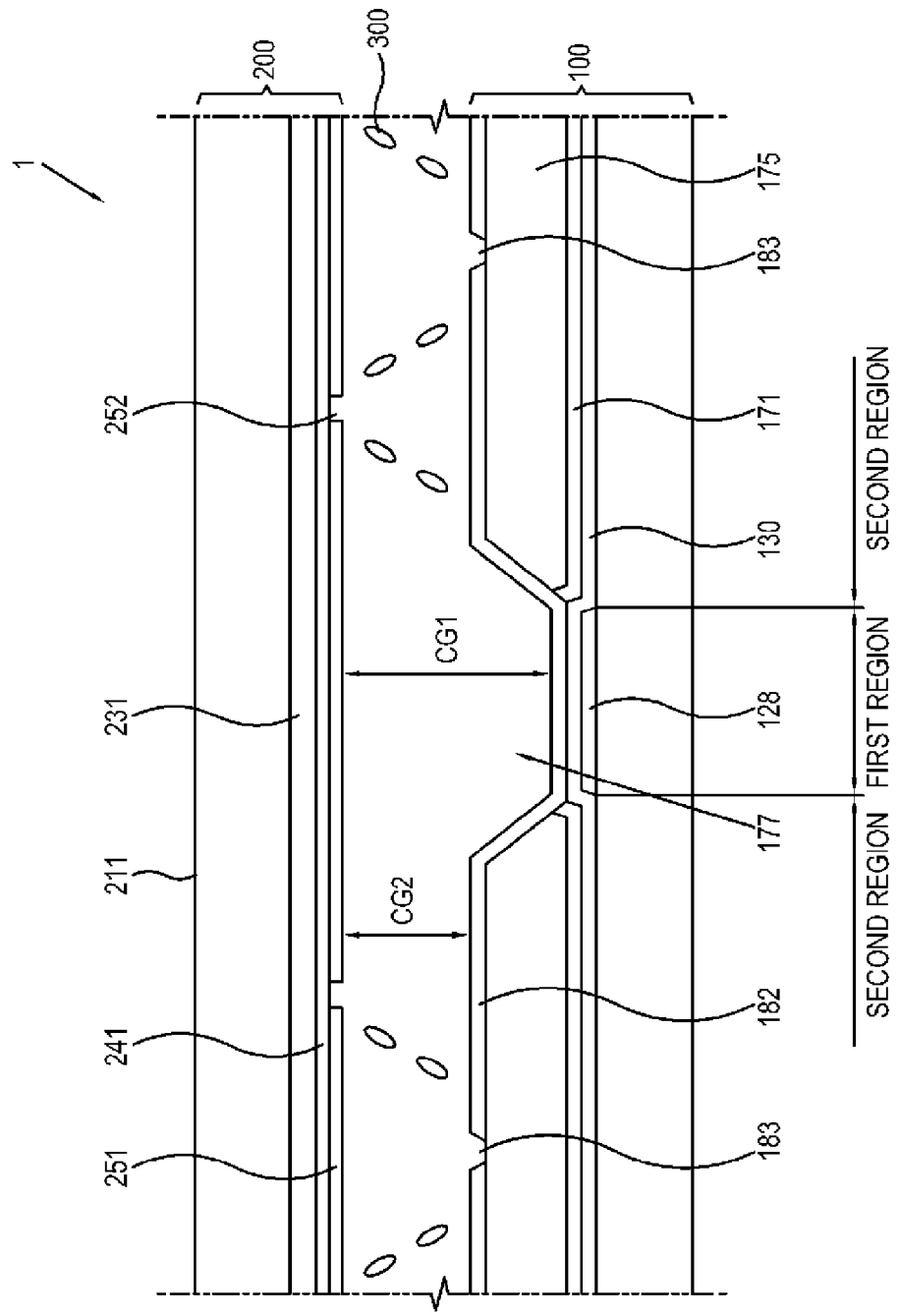
FIG. 5 is a sectional view taken along line V-V in FIG. 3.
Figure 6:
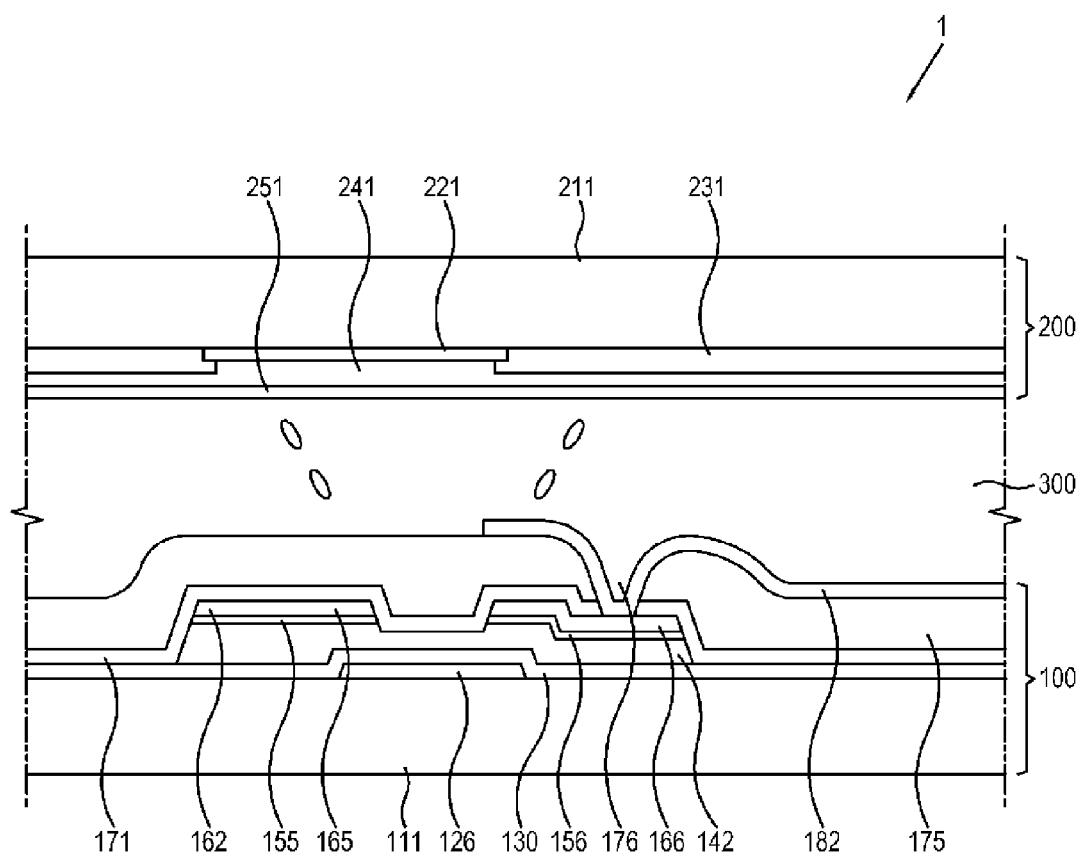
FIG. 6 is a sectional view taken along line VI-VI in FIG. 3.

Hereinafter, the liquid crystal display device according to the first exemplary embodiment will be described with reference to FIG. 3, FIG. 4, FIG. 5, and FIG. 6. Referring to FIG. 5 and FIG. 6, a liquid crystal display device 1 includes a first substrate 100, a second substrate 200 facing the first substrate 100, and a liquid crystal layer 300 interposed therebetween.

First, the first substrate 100 is will be described.

A gate wiring is formed on a first insulating substrate 111. The gate wiring may be a single metal layer or a multi metal layer. The gate wiring includes a gate line 122 extending in a horizontal direction, a gate electrode 126 connected to the gate line 122, and a storage capacitive line 128 that overlaps a pixel electrode 182 to form storage capacitance. The storage capacitive line 128 passes over a middle portion of a pixel and extends parallel to the gate line 122.

A gate insulating film 130 made of inorganic material such as silicon nitride ($SiN_x$) covers the gate wiring on the first insulating substrate 111.

A semiconductor layer 142 made of semiconductor material such as amorphous silicon is formed on the gate insulating film 130 of the gate electrode 126. Ohmic contact layers 155 and 156 made of material such as silicide or n+ hydrogenated amorphous silicon heavily doped with n-type impurities are formed on the semiconductor layer 142. The ohmic contact layers 155 and 156 are excluded from a channel region between a source electrode 165 and a drain electrode 166.

A data wiring is formed on the ohmic contact layers 155 and 156. The data wiring may be also a single or multi metal layer. The data wiring includes a data line 162 formed substantially perpendicular to the gate line 122 and crossing the gate line 122 to form a pixel, a source electrode 165 branched from the data line 162 and extending on the ohmic contact layer 155, and a drain electrode 166 spaced apart from the source electrode 165 and extending on an ohmic contact layer 156.

The drain electrode 166 includes a first drain electrode 166a that is connected to a first pixel electrode 182a and directly applies an electrical signal to the first pixel electrode 182a and a second drain electrode 166b that extends below a second pixel electrode 182b. The second drain electrode 166b and the second pixel electrode 182b form a coupling capacitor $C_{cp}$ together with a passivation film 171.

The passivation film 171, which may be made of inorganic material such as silicon nitride ($SiN_x$), is formed on the data wiring and a portion of the semiconductor layer 142 that is not covered by the data wiring. An organic layer 175 is formed on the passivation film 171. The organic layer 175 is thicker than the gate insulating film 130 and the passivation film 171 and may be formed by various methods including spin coating, slit coating, screen printing, and others known in the art. The organic layer 175 may be made of one of benzocyclobutenes, olefins, acrylic resins, polyimides, and fluorine resins.

The organic layer 175 is thick in order to increase the distance between the data line 162 and the pixel electrode 182, thereby suppressing capacitance from being formed between the data line 162 and the pixel electrode 182. This allows the pixel electrode 182 to be formed near the data line 162 or to partially overlap the data line 162, thereby increasing the aperture ratio. Due to its low dielectric constant, the organic layer 175 may further suppress capacitance from being formed between the data line 162 and the pixel electrode 182.

A contact hole 176 exposing the drain electrode 166 is formed in the passivation film 171 and the organic layer 175. The passivation film 171 and the organic layer 175 are partially removed to form a depressed portion 177 over the storage capacitive line 128. The depressed portion 177 reduces the distance between the storage capacitive line 128 and the pixel electrode 182 to facilitate formation of storage capacitance.

As an alternative, the passivation film 171 may partially or completely remain in the depressed portion 177.

The pixel electrode 182 is formed on the organic film 175. The pixel electrode 182 may be made of transparent conductive material such as indium tin oxide (ITO) or indium zinc oxide (IZO).

On the other hand, the depressed portion 177 causes a difference in height between the pixel electrode 182 located on the storage capacitive line 128 and an adjacent pixel electrode 182. In other words, all of the insulating layers 130, 171, and 175 exist between the first insulating substrate 11 and the pixel electrode 182 in the area where the storage capacitive line 128 is not present, while the thick organic film 175 of the insulating layers 130, 171, and 175 does not exist on the storage capacitive line 128. The cell gap CG1 on the storage capacitive line 128 is larger than an adjacent cell gap CG2 due to the depressed portion 177 formed on the insulating layers 130, 171, and 175.

The pixel electrode 182 includes the first pixel electrode 182a and the second pixel electrode 182b, which are spaced apart from each other by a pixel electrode cutting pattern 183. The second pixel electrode 182b has a trapezoid shape and three sides thereof are surrounded by the first pixel electrode 182a. A pixel electrode cutting pattern 184 is formed parallel to the pixel electrode cutting pattern 183 in the first pixel electrode 182a and the second pixel electrode 182b, respectively.

The first pixel electrode 182a is in direct contact with the first drain electrode 166a via the contact hole 176. The second pixel electrode 182b and the second drain electrode 166b, which face each other, form the coupling capacitor $C_{cp}$ and the second pixel electrode 182b is indirectly connected to the second drain electrode 166b via the coupling capacitor $C_{cp}$.

The pixel electrode cutting patterns 183 and 184 and a common electrode cutting pattern 252, which will be described below, divide the liquid crystal layer 300 into a plurality of sub domains. In this exemplary embodiment, the sub domains are surrounded by the patterns 183, 184, and 252 and are elongated in an oblique direction.

Subsequently, the second substrate 200 will be described.

Black matrixes 221 are formed on a second insulating substrate 211. The black matrixes 221 prevent light from being directly irradiated on the thin film transistor T formed on the first substrate 100. The black matrixes 221 may be made of a photoresist organic material that contains a black pigment such as carbon black or titanium oxide.

Color filters 231 include red, green, and blue color filters patterned on the second insulating substrate 211, with the black matrixes 221 interposed as boundaries therebetween. The color filters 231 may be made of a photosensitive organic material and serve to give a color to light emitted from a backlight unit (not shown) and passed through the liquid crystal layer 300.

An overcoat layer 241 is formed on the color filters 231 and the portions of the black matrixes 221 that are not covered with the color filters 231. The overcoat layer 241 serves to planarize and protect the color filters 231 and may be made of an acryl epoxy material.

A common electrode 251 is formed on the overcoat layer 241. The common electrode 251 may be made of a transparent conductive material such as ITO or IZO. The common electrode 251 directly applies a voltage to the liquid crystal layer 300 along with the pixel electrode 182 on the first substrate 100.

A common electrode cutting pattern 252 is formed in the common electrode 251. The common electrode cutting pattern 252 is formed parallel to the pixel electrode cutting patterns 183 and 184.

The above-described patterns 183, 184, and 252 may be formed in various shapes without being limited to this exemplary embodiment.

The liquid crystal layer 300 is disposed between the first substrate 100 and the second substrate 200. In this exemplary embodiment, the liquid crystal layer 300 operates in a vertically aligned (VA) mode where liquid crystal molecules are vertically aligned when a voltage is not applied. Under application of a voltage, the liquid crystal molecules lie perpendicular to an electric field since the liquid crystal molecules have negative dielectric anisotropy. At that time, if the above-described patterns 183, 184, and 252 are not formed, the liquid crystal molecules may be randomly arranged because their orientations are not determined, and disclination lines occur at boundaries of regions of the liquid crystal layer 300 having different orientations.

The above-described patterns 183, 184, and 252 form a fringe field to determine the orientation of the liquid crystal molecules when a voltage is applied to the liquid crystal layer 300. In addition, the liquid crystal layer 300 is divided into a plurality of sub domains depending on arrangement of the patterns 183, 184, and 252.

The above-described liquid crystal display device may have an after image problem, particularly at an edge of the storage capacitive line 128 where the cell gap is varied. In this exemplary embodiment, the pixel electrode cutting patterns 183 and 184 and the common electrode cutting pattern 252 are designed to prevent such an afterimage.

Irregular parts 185, 253, and 254 are formed in the pixel electrode cutting pattern 183 and the common electrode cutting pattern 252. First irregular parts 253 having enlarged width and second irregular parts 254 having reduced width are alternately formed in the common electrode cutting pattern 252. Third irregular parts 185 having enlarged width are formed in the pixel electrode cutting pattern 183, while the pixel electrode cutting pattern 184 has uniform width.

The irregular parts 185, 253, and 254 determine the orientation of the liquid crystal layer 300 at boundaries between sub domains to prevent spots or after images from occurring at the boundaries between sub domains.

The first and second irregular parts 253 and 254 formed in the common electrode cutting pattern 252, particularly in the vicinity of the storage capacitive line 128 where the cell gap is varied, may be effective in alleviating after images.

Now, the irregular parts 253 and 254 of the common electrode cutting pattern 252 in the vicinity of the storage capacitive line 128 will be described in detail with reference to FIG. 4 and FIG. 5.

The storage capacitive line 128 is elongated and parallel to the gate line 122. The common electrode cutting pattern 252 is branched with three sub common electrode cutting patterns 252a, 252b, and 252c in a first region corresponding to the storage capacitive line 128. Specifically, the three sub common electrode cutting patterns 252a, 252b, and 252c intersect each other in a cross point as a portion of the first region.

Two sub common electrode cutting patterns 252a and 252b are vertically symmetrical to each other around the storage capacitive line 128 and extend to a second region adjacent to the first region. The remaining sub common electrode cutting pattern 252c extends parallel to the storage capacitive line 128.

In the first exemplary embodiment, the depressed portion 177 is about the same size as the storage capacitive line 128 and substantially overlaps the storage capacitive line 128. Accordingly, the first region corresponding to the storage capacitive line 128 has a large cell gap while the second region has a small cell gap.

The sub common electrode cutting patterns 252a and 252b have no irregular part in the first region. Of the irregular parts 253 and 254, an external irregular part 253a closest to the first region has an enlarged width for the following reason.

A singular point of liquid crystal has a "+" sign in the cross point where the three sub common electrode cutting patterns 252a, 252b, and 252c meet each other. The liquid crystal singular point has a "+" sign at the external irregular part 253a and the first irregular part 253 having the enlarged width while the liquid crystal singular point has a "−" sign at the second irregular part 254 having the reduced width.

Considering continuity of liquid crystal director arrangement, the "−" singular point occurs at a middle point between the cross point having the "+" singular point and the external irregular part 253a having the "+" singular point.

However, since d1 which refers to a length of the sub common electrode cutting patterns 252a and 252b between the cross point and the boundary of the first region is greater than a distance d2 which refers to a length of the sub common electrode cutting patterns 252a and 252b between the boundary of the first region and the external irregular part 253a, the "−" singular point occurs in the first region. The occurred "−" singular point has no effect on an after image since it is covered with the storage capacitive line 128. The length d1 may be between 110% and 300% of the distance d2.

On the other hand, the "+" singular point occurring at the external irregular part 253a is controlled by the external irregular part 253a in such a manner that it has no effect on the after image.

Hereinafter, a method of manufacturing the liquid crystal display device according to the first embodiment will be described with reference to FIG. 7A, FIG. 7B, FIG. 8A, FIG. 8B, FIG. 9A, FIG. 9B, FIG. 10A, FIG. 10B, FIG. 11A, FIG. 11B, FIG. 12A, FIG. 12B, FIG. 13A, FIG. 13B, FIG. 14A, and FIG. 14B.

Figure 7A:
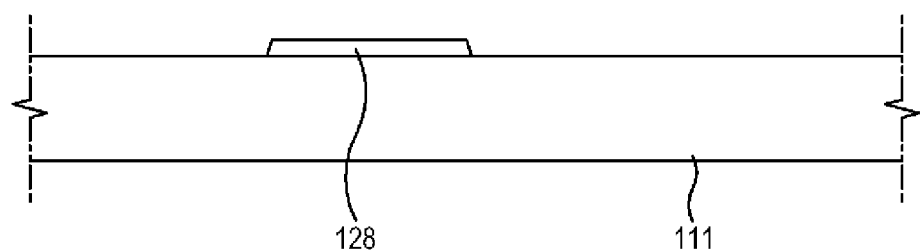
FIG. 7A, FIG. 7B, FIG. 8A, FIG. 8B, FIG. 9A, FIG. 9B, FIG. 10A, FIG. 10B, FIG. 11A, FIG. 11B, FIG. 12A, FIG. 12B, FIG. 13A, FIG. 13B, FIG. 14A, and FIG. 14B are views showing a method of manufacturing the liquid crystal display device according to the first exemplary embodiment of the invention.
Figure 7B:
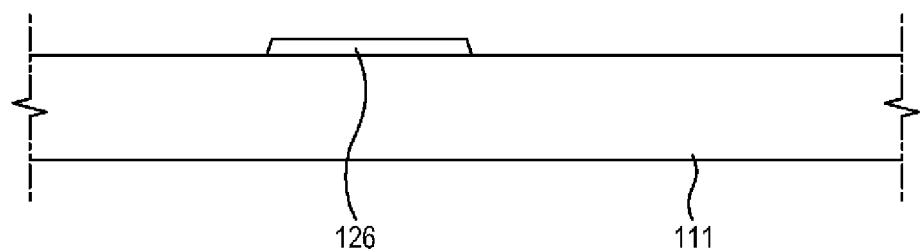

First, as shown in FIG. 7A and FIG. 7B, a gate metal layer is deposited and patterned to form the gate line 122, the gate electrode 126, and the storage capacitive line 128.

Figure 8A:
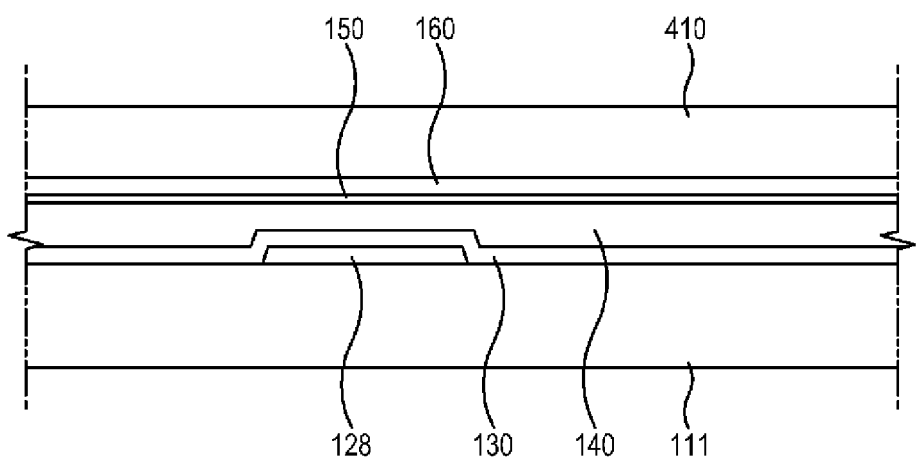
Figure 8B:
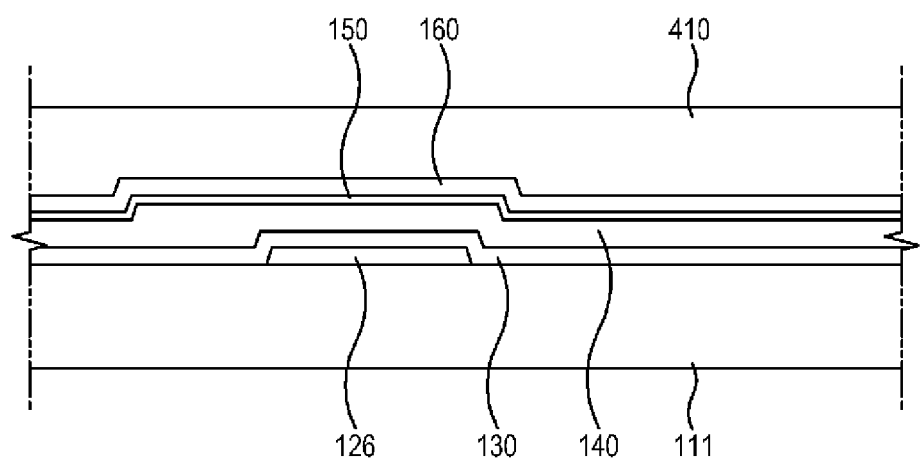

Next, as shown in FIG. 8A and FIG. 8B, the gate insulating film 130, which may be made of silicon nitride, the semiconductor layer 140, and the ohmic contact layer 150 are successively deposited at thicknesses of 1500 Å to 5000 Å, 500 Å to 2000 Å, and 300 Å to 600 Å, respectively, using a chemical vapor deposition (CVD) method. Subsequently, a data metal layer 160 is formed to construct the data wiring, and then, a photoresist film 410 is coated thereon at thickness of 1 µm to 2 µm.

Figure 9A:
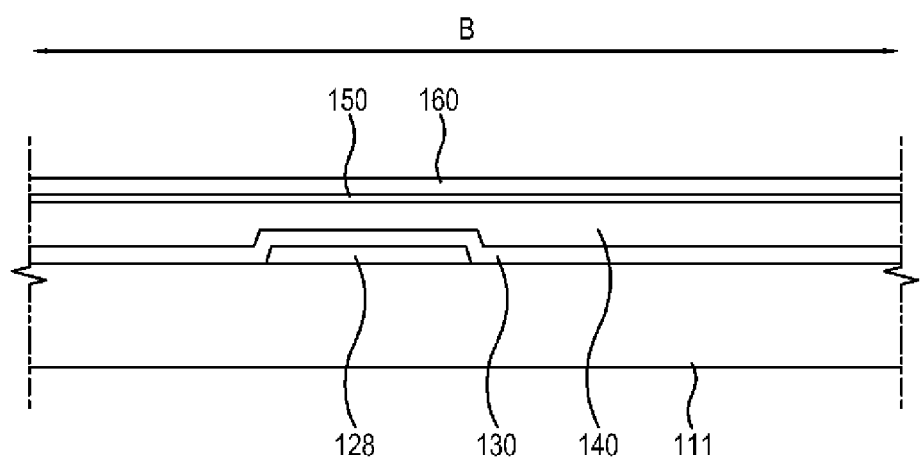
Figure 9B:
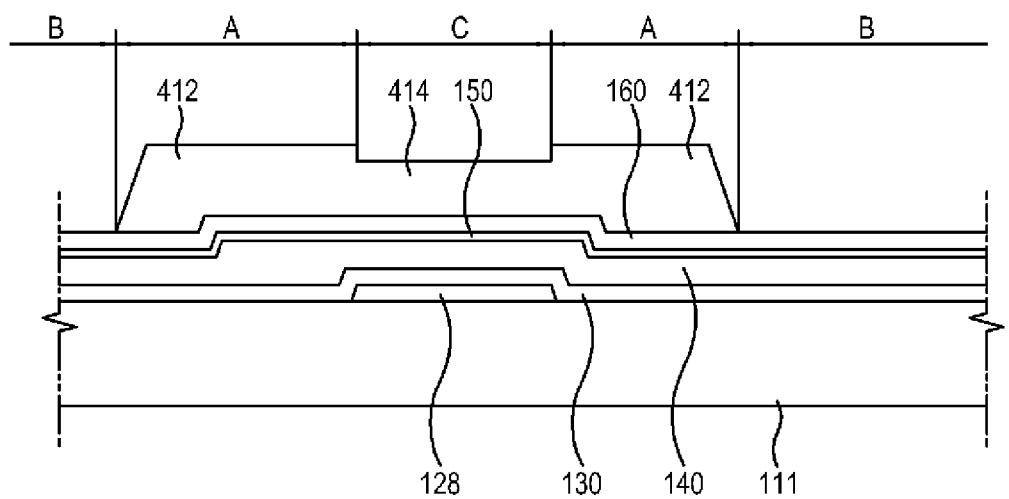

Thereafter, the photoresist film 410 is irradiated with light via a mask and the photoresist film 410 is developed to form a photoresist film pattern 412 and 414, as shown in FIG. 9A and FIG. 9B. In this case, a first portion 414 of the photoresist film pattern 412 and 414, which is located at a channel region C of the thin film transistor, that is, between the source electrode 165 and the drain electrode 166, is formed to be thinner than a second portion 412 located in a data wiring region A, that is, a region where the data wiring is to be formed, and a photoresist film pattern 412 and 414 located in the other region B is completely removed. At this time, the ratio of the thickness of the photoresist film 414 remaining in the channel region C to the thickness of the photoresist film 412 remaining in the data wiring region A may be varied depending on process conditions in an etching process to be described below. The thickness of the first portion 414 may be less than ½ of the thickness of the second portion 412, for example, less than 4000 Å.

The thickness of the photoresist film pattern may be varied in various ways. A pattern having a slit or lattice shape or a semitransparent film may be formed on the mask for the data wiring region A in order to adjust the transmittance of light that passes through the data wiring region A.

In this case, the gap between the slits or patterns, that is, the slit width, may be smaller than resolution of an exposer. If the semitransparent film is used, a film having different transmittance or different thickness may be used to adjust the transmittance when a mask is manufactured.

When the photoresist film is irradiated with light via the mask, polymers in the portions directly exposed to the light may be completely decomposed. However, polymers in the portions where the slit pattern or the semitransparent film is formed may be partially decomposed since the amount of irradiation on the portion is small, and polymers in the portions covered with a light shielding film may not be decomposed. Subsequently, when the photoresist film is developed, only the portions where the polymers are not decomposed are left, and the thickness of the photoresist film at a central portion that was irradiated with a small amount of light is smaller than the thickness of photoresist at the portions not irradiated with light at all. At this time, the exposing time may be adjusted so that all polymers are not decomposed.

The photoresist pattern 414 may be formed by exposing and developing a photoresist film made of a reflowable material using a conventional mask having a transparent portion and an opaque portion, and then reflowing the developed photoresist film such that some of the photoresist film flows down to a portion where the photoresist film does not remain.

Subsequently, the photoresist pattern 414 and the layers therebelow, that is, the data metal layer 160, the ohmic contact layer 150, and the semiconductor layer 140, are etched in such a manner that the data wiring and the films therebelow remain in the data wiring region A, the semiconductor layer 140 remains in the channel region C, and the three layers 160, 150, and 140 are all removed in region B to expose the gate insulating film 130.

Figure 10A:
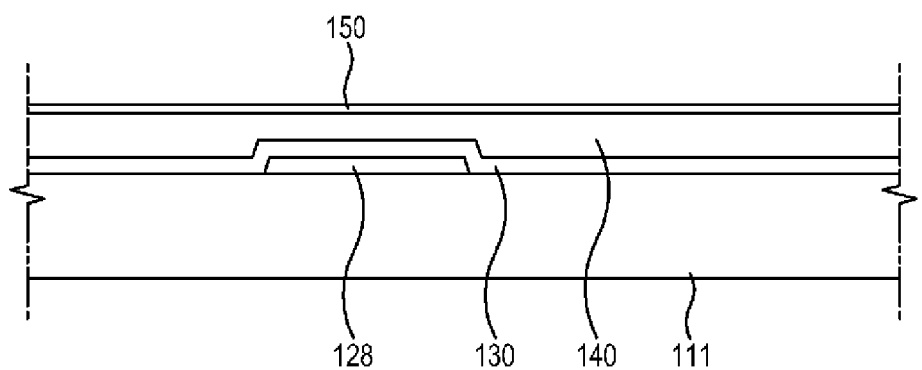
Figure 10B:
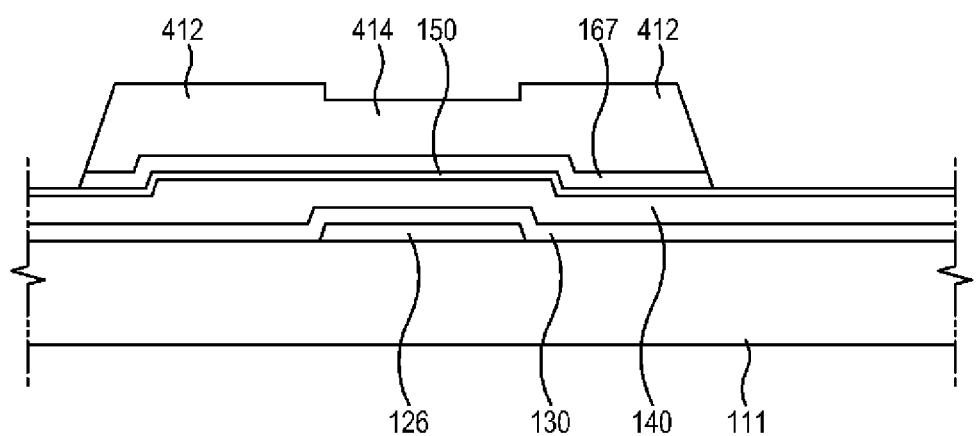

First, as shown in FIG. 10A and FIG. 10B, the data metal layer 160 exposed in region B is removed to expose the ohmic contact layer 150 therebelow using a dry etching process or a wet etching process. At this time, it may be advantageous that the photoresist pattern 412 and 414 is not nearly etched when the data metal layer 160 is etched. However, in case of the dry etching process, the photoresist pattern 412 and 414 may also be etched since it is difficult to etch only the data metal layer 160 without etching the photoresist pattern 412 and 414. For the dry etching process, the first portion 414 is thicker than that formed in the wet process and is partially etched so the data metal layer 160 is not exposed.

Thus, as shown in FIG. 10A and FIG. 10B, the data metal layer 160 of the other portion B is completely removed, thereby exposing the ohmic contact layer 150. At this time, the remaining data metal layer 167 has the same shape as the data wiring except that the source and drain electrode 165 and 166 are interconnected, rather than spaced apart from each other. In addition, in the case of the dry etching process, the photoresist film pattern 412 and 414 is etched to a certain thickness.

Figure 11A:
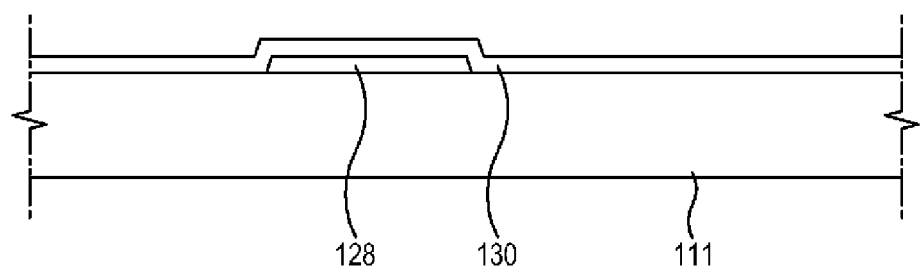
Figure 11B:
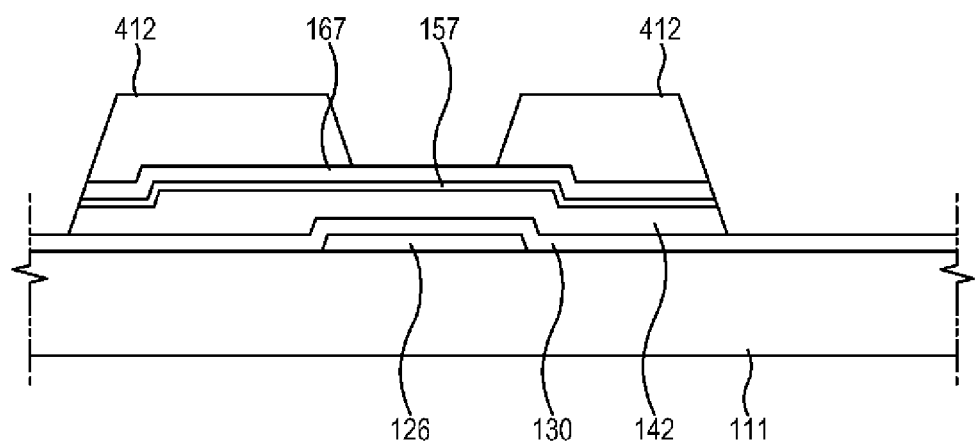

Subsequently, as shown in FIG. 11A and FIG. 11B, the ohmic contact layer 150 exposed in the other region B and the semiconductor layer 140 therebelow are simultaneously removed along with the first portion 414 of the photoresist film by the dry etching process. In this case, the dry etching process has to be performed in such a manner that the photoresist pattern 412 and 414, the ohmic contact layer 150, and the semiconductor layer 140 are simultaneously etched and the gate insulating film 130 is not etched. Particularly, the photoresist pattern 412 and 414 may have about the same etching rate as the semiconductor layer 140.

Thus, as shown in FIG. 11A and FIG. 11B, the first portion 414 of the channel region C is removed to expose the data metal layer 167 for the source and drain electrodes, and the ohmic contact layer 150 of region B and the semiconductor layer 140 are removed to expose the gate insulating film 130. On the other hand, the second portion 412 of the data wiring region C is also etched to be thinned. In addition, in this step, the semiconductor layer 142 is completed. Reference numeral 157 denotes an ohmic contact layer below the data metal layer 167.

On the other hand, the first portion 414 of the channel region C may be removed in an oxygen plasma process for the data metal layer 167.

Subsequently, photoresist remnants on the data metal layer 167 of the channel region C may be removed by an ashing process.

Figure 12A:
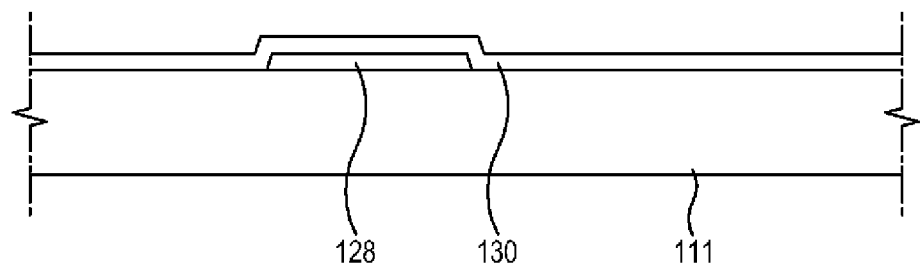
Figure 12B:
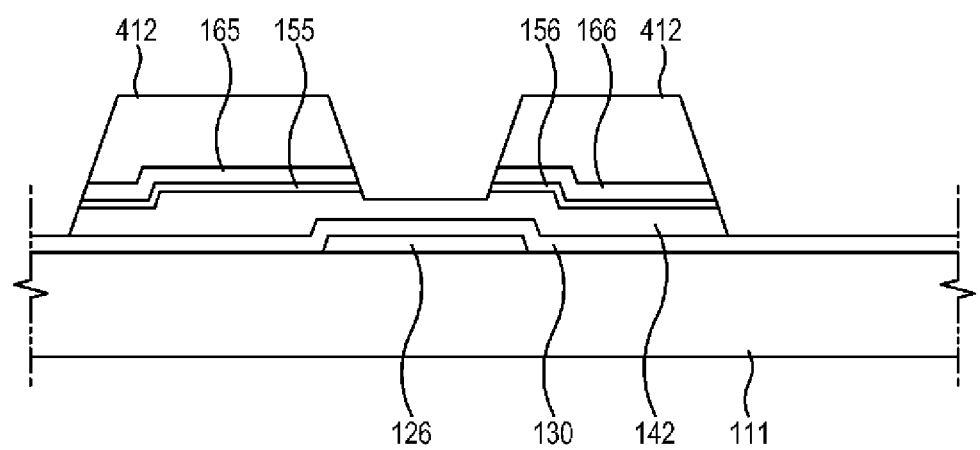

Next, as shown in FIG. 12A and FIG. 12B, the data metal layer 167 of the channel C and the ohmic contact layer 157 therebelow are etched out.

Since it is not easy to find the etching stopping point of the ohmic contact layer 157, the semiconductor layer 142 may be partially removed to be thinned and, at the same time, the second portion 412 of the photoresist pattern may be etched to a certain thickness. This etching may be performed such that the gate insulating film 130 is not etched. Of course, the photoresist film pattern may be so thick that the data wiring therebelow is not exposed by etching of the second portion 412.

Thus, the data wiring and the ohmic contact layers 155 and 156 therebelow are completed with the source electrode 165 and the drain electrode 166 spaced apart from each other.

Thereafter, the second portion 412 of the photoresist film remaining in the data wiring region A is removed. Alternatively, the second portion 412 may be removed before the ohmic contact layer 177 is removed after the data metal layer 167 of the channel region C is removed.

Figure 13A:
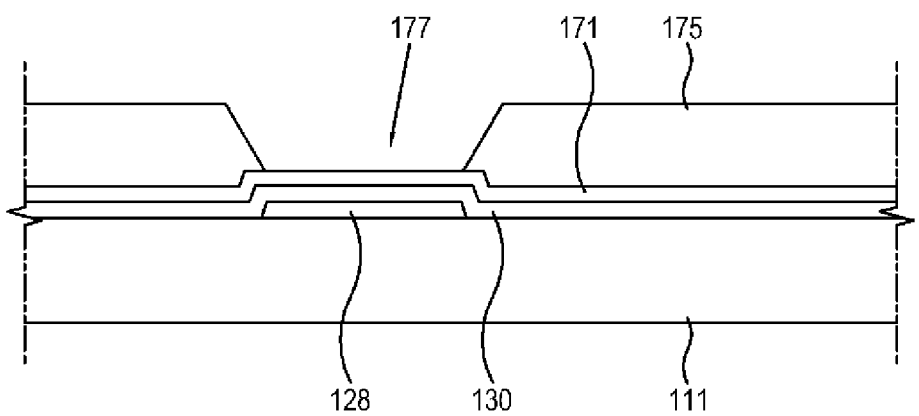
Figure 13B:
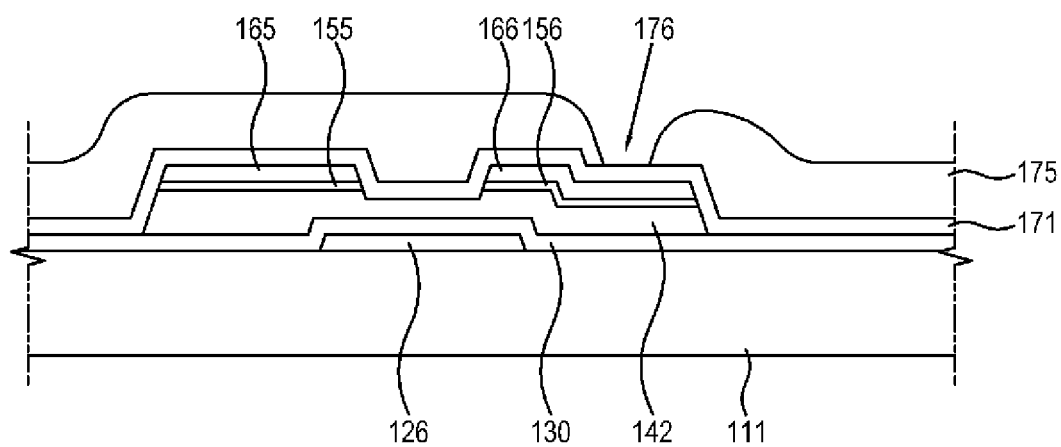

Next, as shown in FIG. 13A and FIG. 13B, the passivation film 171 and the organic layer 175 are formed. The organic layer 175 may be formed by forming an organic coating layer on the passivation film 171 and exposing and developing the organic coating layer.

The organic layer 175 is formed with the contact hole 176 corresponding to the drain electrode 166 and the depressed portion 177 corresponding to the storage capacitive line 128. The organic layer 175 is completely removed from the contact hole 176 and the depressed portion 177.

Figure 14A:
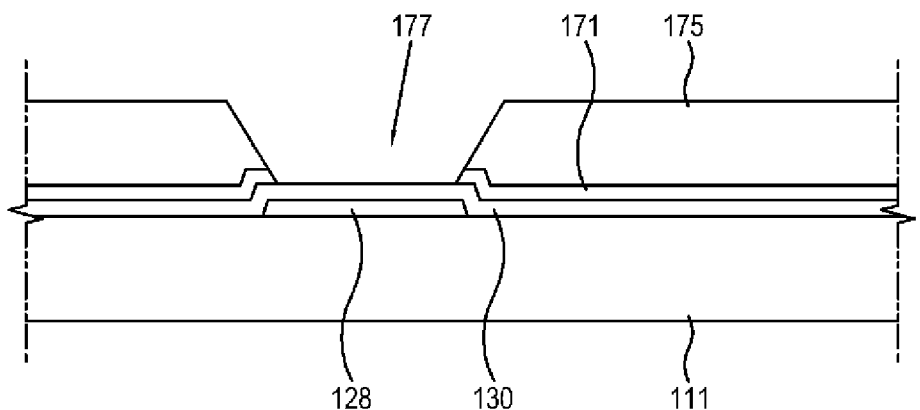
Figure 14B:
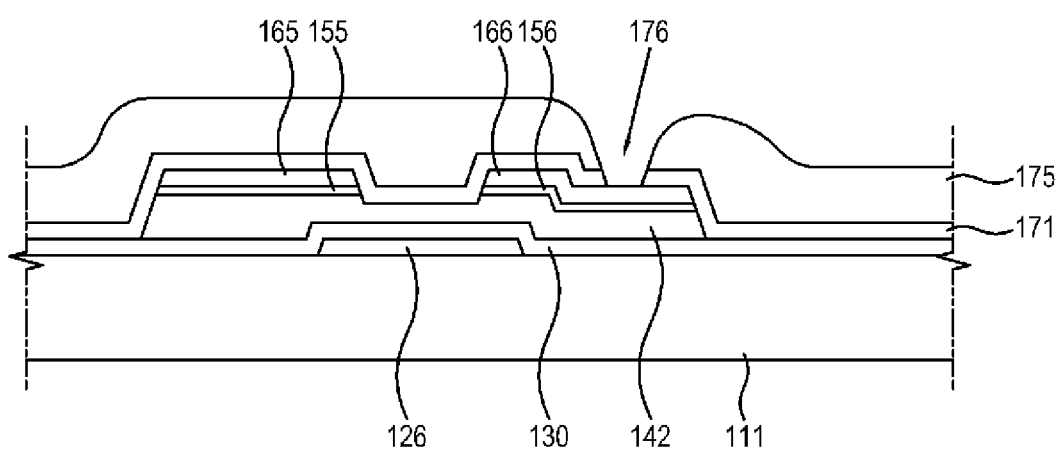

Subsequently, as shown in FIG. 14A and FIG. 14B, the passivation film 171 below the contact hole 176 and the depressed portion 177 is removed using the organic layer 175 as a mask. On the other hand, in patterning the organic layer 175, if the organic layer 175 is left in the depressed portion 177, at least some of the passivation film 171 may be left in the depressed portion 177.

Finally, as shown in FIG. 5 and FIG. 6, an ITO layer or an IZO layer having a thickness of 400 Å to 500 Å is deposited and photolithographed to form the pixel electrode 182 connected to the drain electrode 166. When the pixel electrode 182 is formed, the pixel electrode cutting patterns 183 and 184 may also be formed simultaneously.

The second substrate 200 may be manufactured according to any known or otherwise suitable method, and therefore, an explanation will be omitted. After completing both substrates 100 and 200, the liquid crystal layer 300 is injected between both substrates 100 and 200 to complete the liquid crystal display device 1.

In the above first exemplary embodiment, the irregular parts 253 and 254 may be modified in various ways.

Figure 15A:
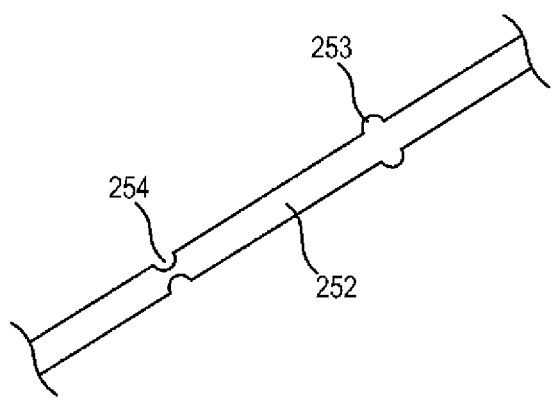
FIG. 15A and FIG. 15B are views showing different types of irregular parts in the liquid crystal display device according to the first exemplary embodiment of the invention.
Figure 15B:
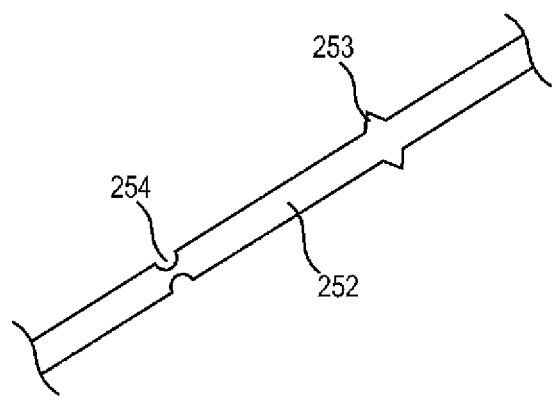

As shown in FIG. 15A, the irregular parts 253 and 254 are enlarged or reduced in a semicircular shape. As shown in FIG. 15B, the enlarged first irregular part 253 has a triangular shape and the reduced second irregular part 254 has a semicircular shape.

Figure 16:
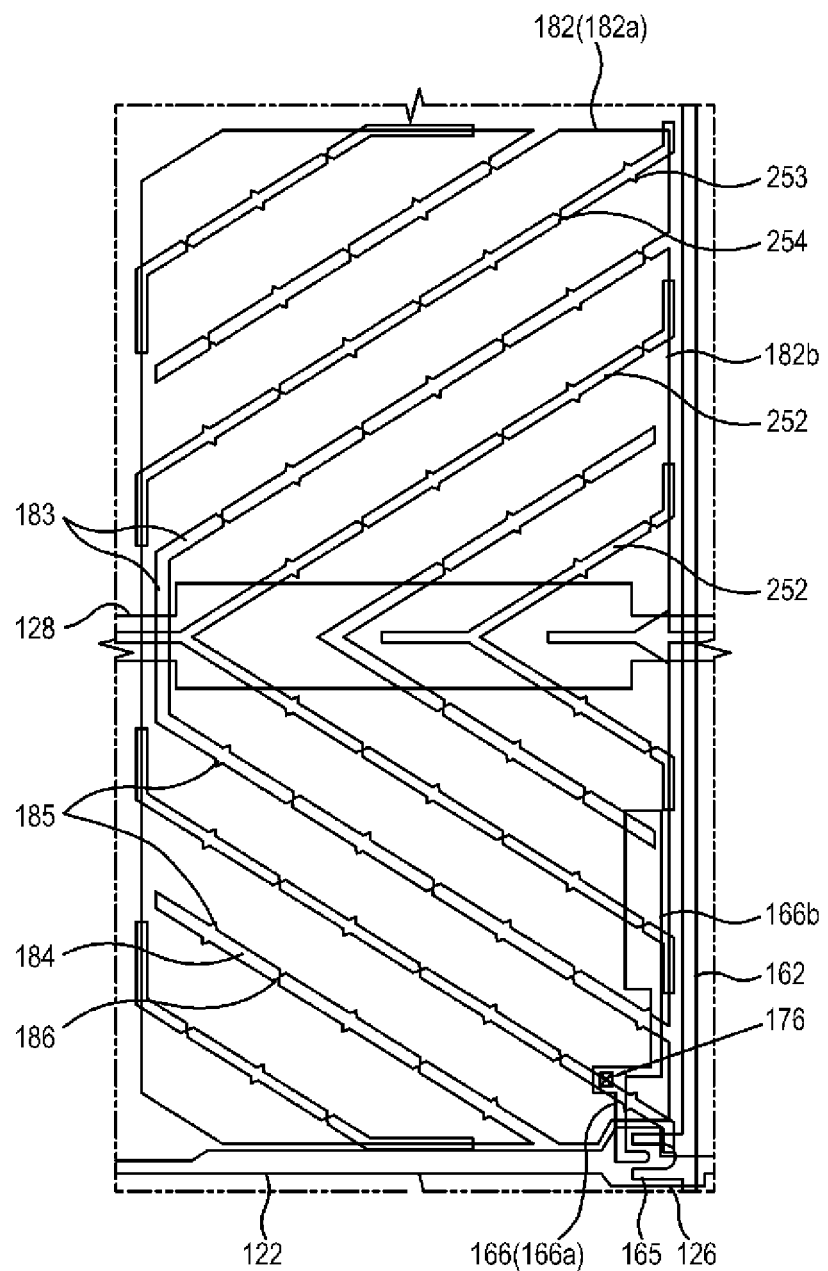
FIG. 16 shows a layout of a liquid crystal display device according to a second exemplary embodiment of the invention.

Now, a second exemplary embodiment of the invention will be described with reference to FIG. 16.

Pixel electrode cutting patterns 183 and 184 are formed with a third irregular part 185 having an enlarged width and a fourth irregular part 186 having a reduced width. The third irregular part 185 and the fourth irregular part 186 are alternatively disposed.

Figure 17:
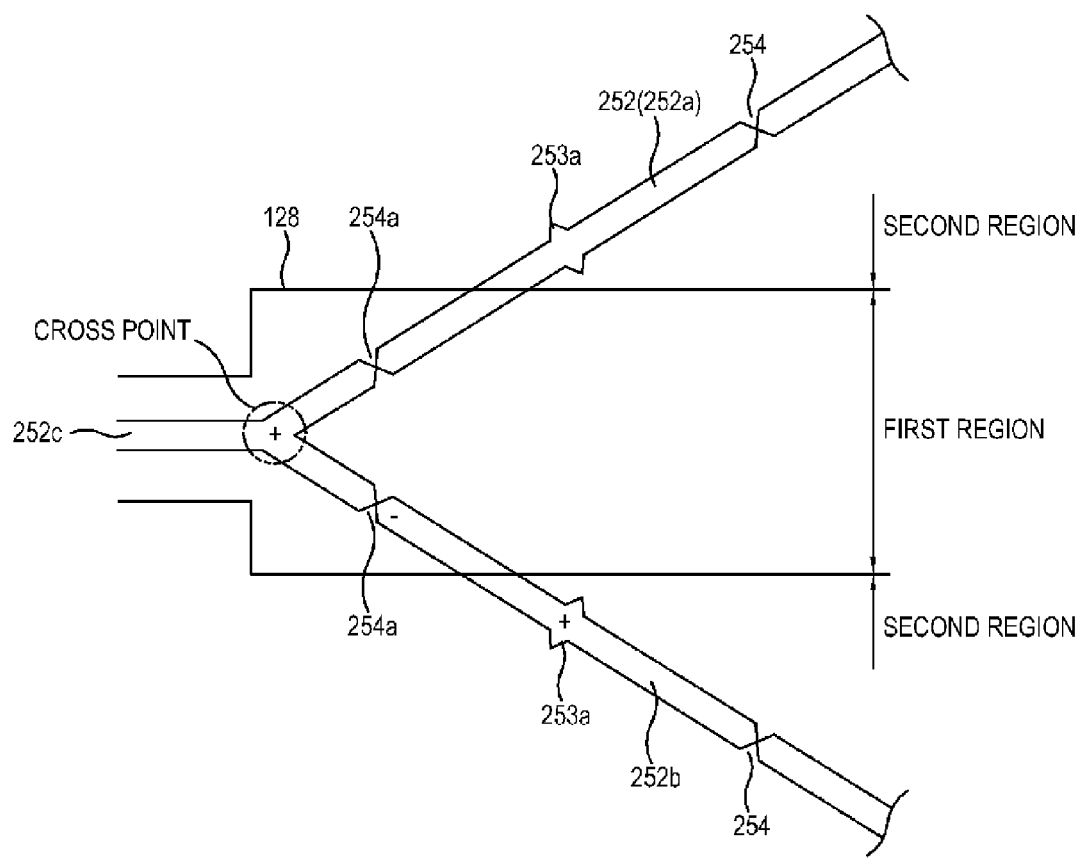
FIG. 17 shows a layout of a liquid crystal display device according to a third exemplary embodiment of the invention.

Now, a third exemplary embodiment of the invention will be described with reference to FIG. 17.

An internal irregular part 254a reduced in width is further formed in the sub common electrode cutting patterns 252a and 252b in the first region. The internal irregular part 254a has a "−" singular point. A position of the "−" singular point formed between a "+" singular point of the cross point and a "+" singular point of an external irregular part 253a is determined by the internal irregular part 254a. The internal irregular part 254a is located on the storage capacitive line 128 so it may have no effect on an after image.

Figure 18:
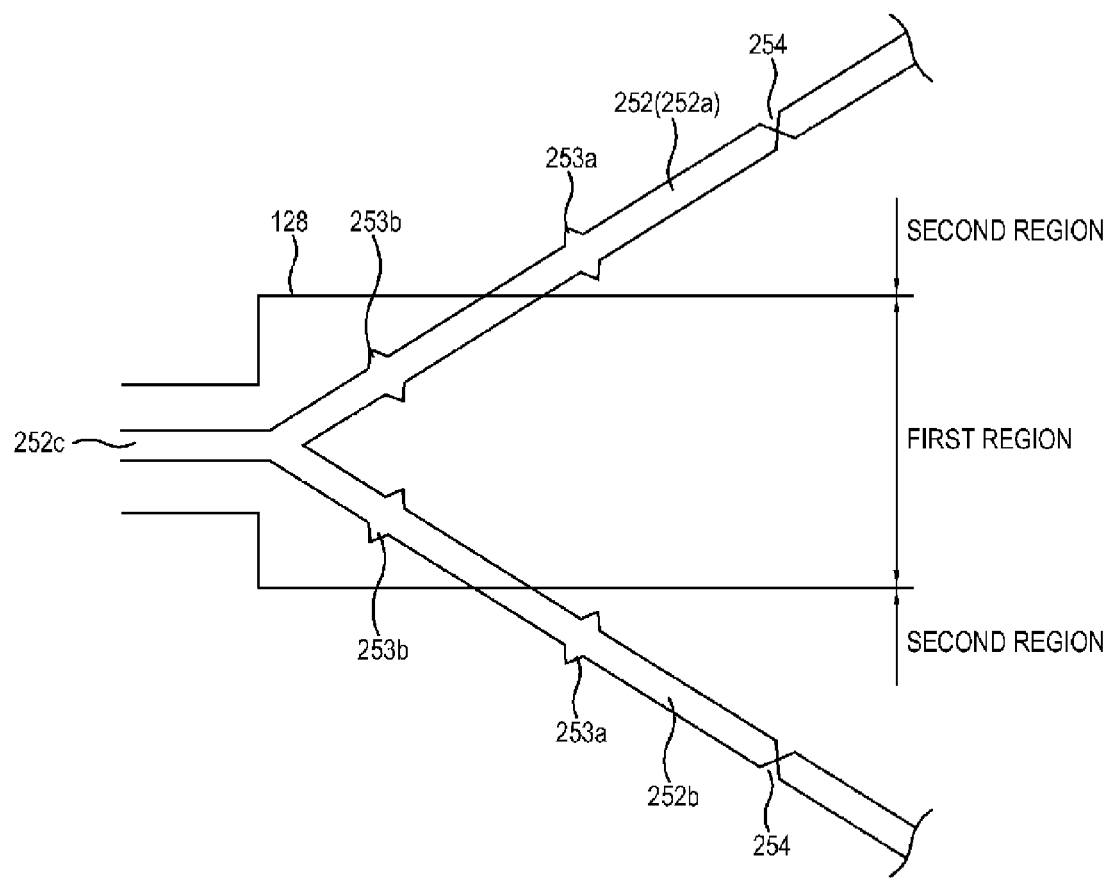
FIG. 18 shows a layout of a liquid crystal display device according to a fourth exemplary embodiment of the invention.

Now, a fourth exemplary embodiment of the invention will be described with reference to FIG. 18.

An internal irregular part 253b enlarged in width is further formed in the sub common electrode cutting patterns 252a and 252b in the first region. The internal irregular part 253b is located on the storage capacitive line 128 so it may have no effect on an after image.

Figure 19:
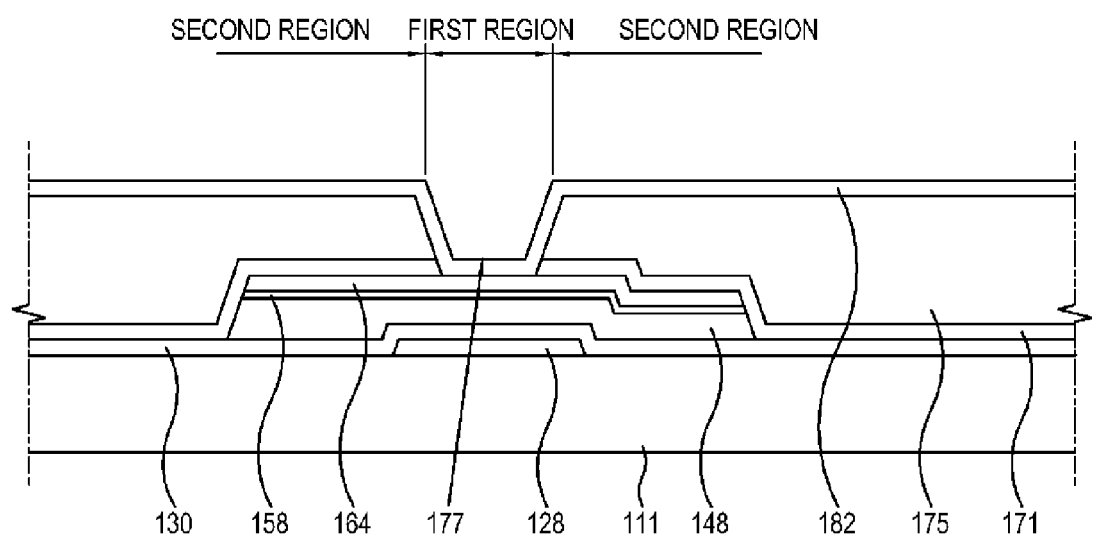
FIG. 19 is a sectional view of a liquid crystal display device according to a fifth exemplary embodiment of the invention.

Now, a fifth exemplary embodiment of the invention will be described with reference to FIG. 19. FIG. 19 is a sectional view taken along line V-V in FIG. 3.

A capacitive semiconductor layer 148, a capacitive ohmic contact layer 158, and a capacitive data line 164 are formed on the storage capacitive line 128. The passivation film 171 and the organic film 175 on the capacitive data line 164 are removed to form the depressed portion 177.

In the fifth exemplary embodiment, the depressed portion 177 is formed to be narrower than the storage capacitive line 128. Accordingly, the first region lower than other regions is formed to be narrower than the storage capacitive line 128.

As an alternative, the first region may not overlap or may partially overlap the storage capacitive line 128.

Figure 20:
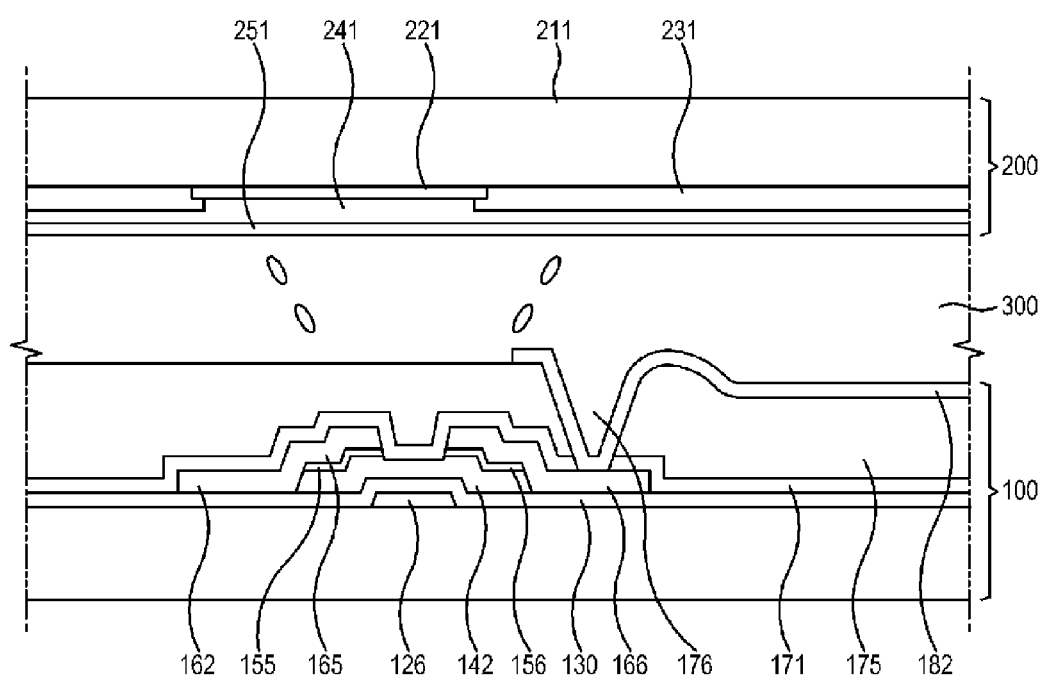
FIG. 20 is a sectional view of a liquid crystal display device according to a sixth exemplary embodiment of the invention.

Now, a sixth exemplary embodiment of the invention will be described with reference to FIG. 20. FIG. 20 is a sectional view taken along line VI-VI in FIG. 3.

The data wiring does not completely overlap the ohmic contact layers 155 and 156. That is, the ohmic contact layers 155 and 156 do not exist below the data line 162, and the drain electrode 166 partially overlaps the ohmic contact layer 156.

In a method of manufacturing the liquid crystal display device according to the sixth exemplary embodiment, after the semiconductor layer 142 and the ohmic contact layers 155 and 156 are patterned, the data metal layer is formed and patterned to form the data wiring. That is, the ohmic contact layers 155 and 156 and the data wiring are patterned using different masks.

Figure 21:
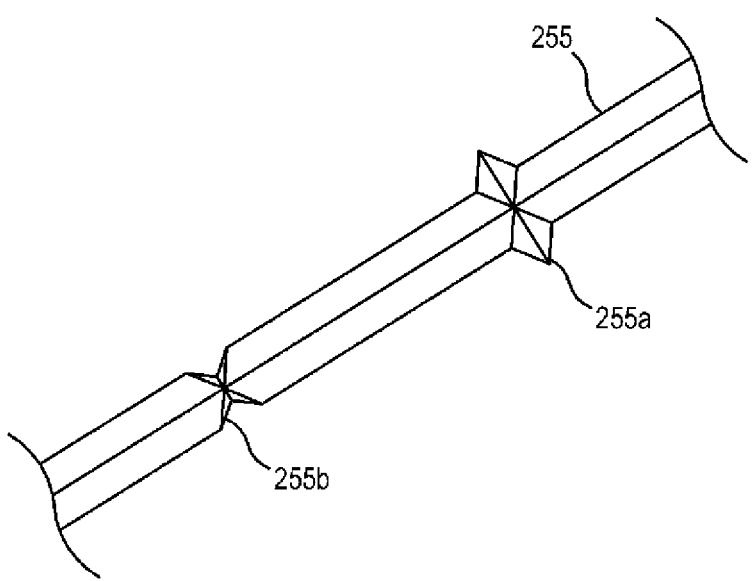
FIG. 21 is a view showing a domain forming member according to a seventh exemplary embodiment of the invention.

Now, a seventh exemplary embodiment of the invention will be described with reference to FIG. 21.

The cutting patterns 183, 184 and 252 in the first exemplary embodiment are domain forming members which divide the liquid crystal layer 300 into a plurality of sub domains. In the seventh exemplary embodiment, a common electrode 252 may be not formed with a cutting pattern. A protrusion 255 is provided as the domain forming member disposed on the common electrode 252.

The protrusion 255 is formed to contact the liquid crystal layer 300 and formed with a enlarged part 255a and reduced part 255b. The protrusion 255 may be formed of photoresist material.

Figure 22:
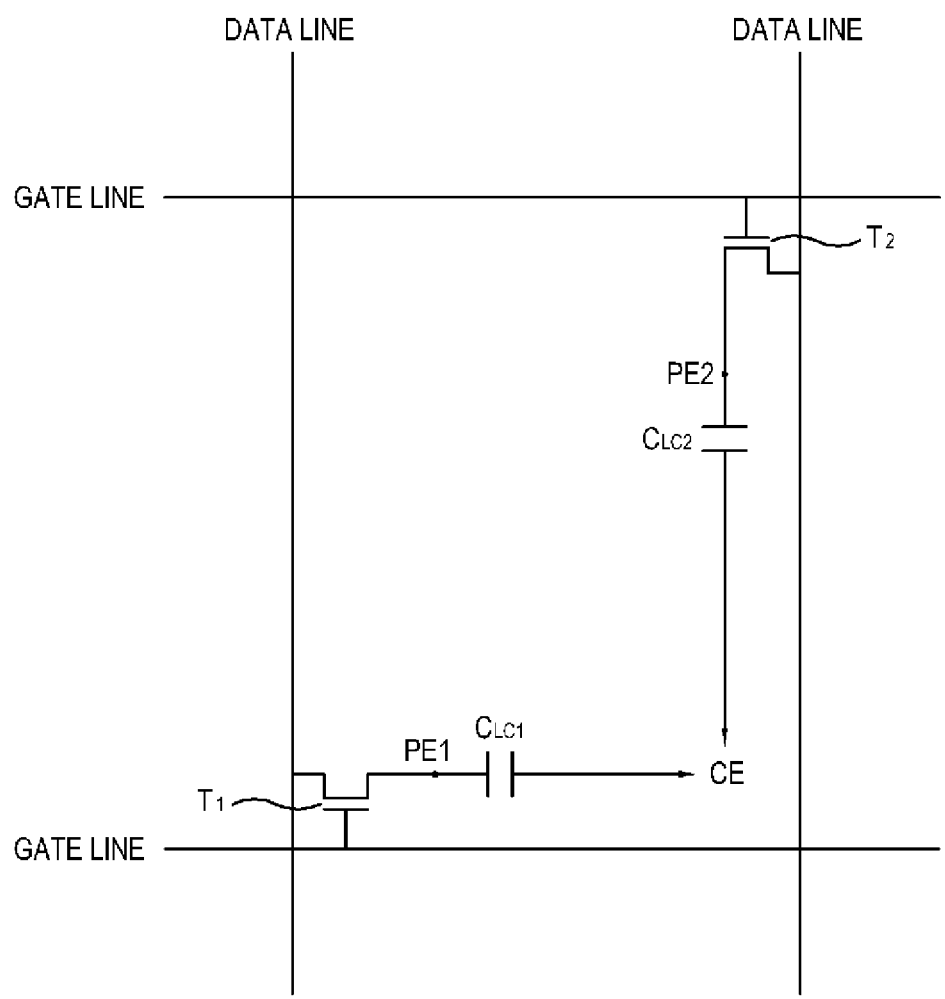
FIG. 22 is an equivalent circuit diagram of the liquid crystal display device according to an eighth exemplary embodiment of the invention.
Figure 23:
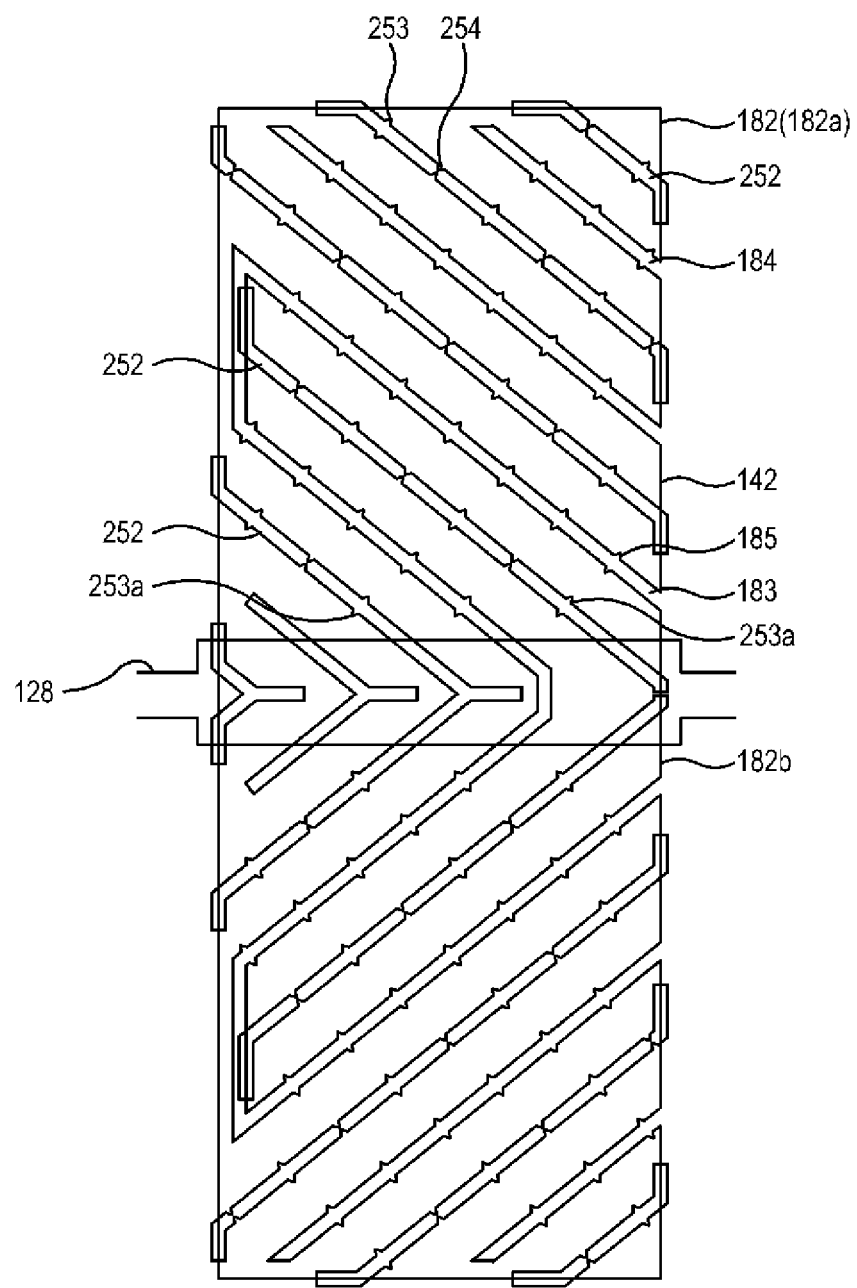
FIG. 23 shows a layout of a liquid crystal display device according to the eighth exemplary embodiment of the invention.

Now, a eighth exemplary embodiment of the invention will be described with reference to FIG. 22 and FIG. 23.

The pixel electrode 182 includes the first pixel electrode 182a and the second pixel electrode 182b that are spaced apart from each other. The second pixel electrode 182b has a bent shape and is located in a middle portion of the pixel electrode 182.

The first pixel electrode 182a and the second pixel electrode 182b are connected to different thin film transistors T1 and T2 and receive different data voltages.

Figure 24:
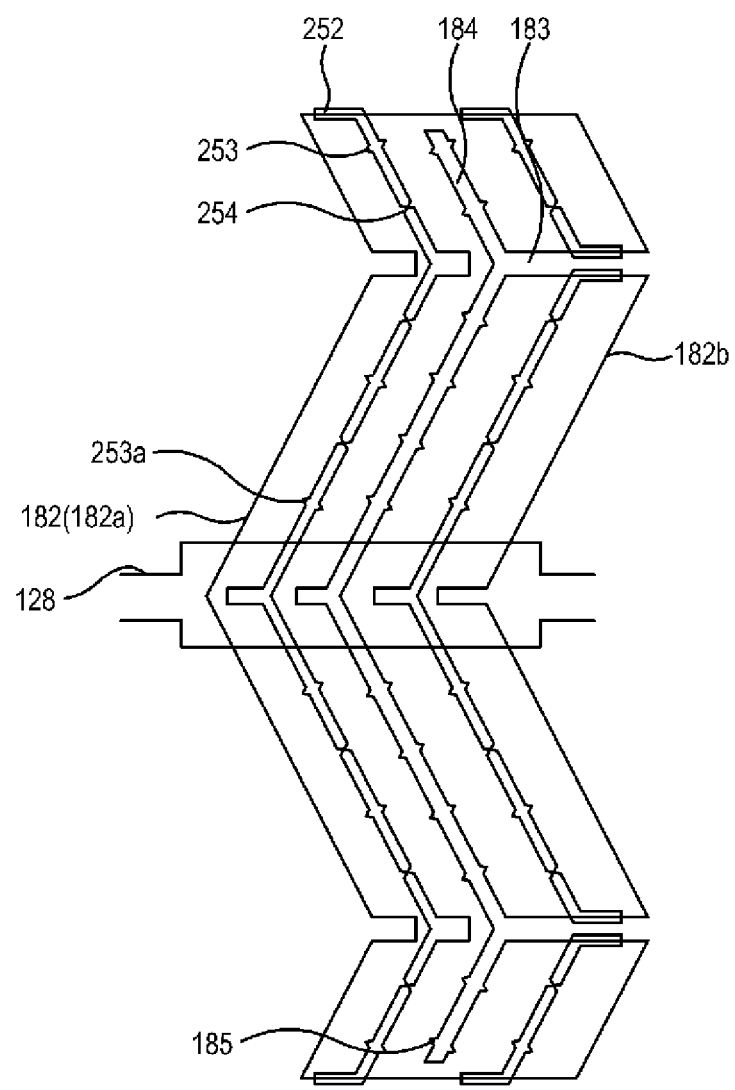
FIG. 24 shows a layout of the liquid crystal display device according to a ninth exemplary embodiment of the invention.

Now, a ninth exemplary embodiment of the invention will be described with reference to FIG. 24.

The pixel electrode 182 is triply bent and vertically elongated. The pixel electrode 182 includes the first pixel electrode 182a and the second pixel electrode 182b that are spaced apart from each other. The second pixel electrode 182b has a bent shape and is located in a middle portion of the pixel electrode 182.

If the first pixel electrode 182a is directly connected to a thin film transistor, the second pixel electrode 182b may be indirectly connected to the thin film transistor via a coupling capacitor Ccp, like the first exemplary embodiment. Alternately, the first pixel electrode 182a and the second pixel electrode 182b may be connected to a different thin film transistor, like the eighth exemplary embodiment.

Figure 25:
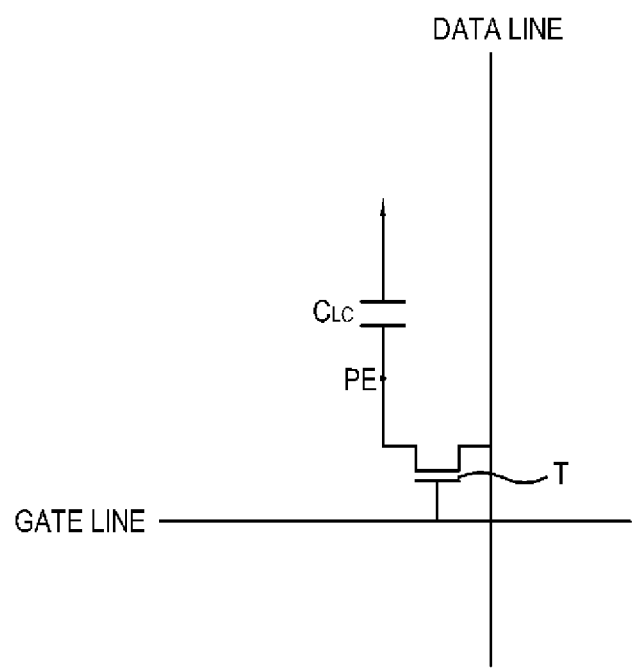
FIG. 25 is an equivalent circuit diagram of a liquid crystal display device according to a tenth exemplary embodiment of the invention.

Finally, a tenth exemplary embodiment of the invention will be described with reference to FIG. 25.

A pixel electrode PE is singly provided without being spaced apart from another pixel electrode. The pixel electrode PE may be provided in various shapes such as a rectangular shape, a bent shape, a triple-bent shape, and the like.

As apparent from the above description, the present invention provides a liquid crystal display device that may reduce after images.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display device, comprising:
a first substrate comprising:
  a pixel electrode;
  a storage capacitive line; and
  an insulating layer disposed between the storage capacitive line and the pixel electrode, a top surface of the insulating layer having a first height in a first region situated above the storage capacitive line and a second height in a second region adjacent to the first region, the first height being lower than the second height;
a second substrate that faces the first substrate, the second substrate comprising a common electrode;
a liquid crystal layer disposed between the first substrate and the second substrate; and
a domain forming member disposed in the first region and the second region,
wherein the domain forming member comprises:
  a first irregular part comprising a greater width than a width of the domain forming member; and
  a second irregular part comprising a width less than the width of the domain forming member,
wherein the first irregular part and the second irregular part are alternately disposed in the second region,
wherein the first irregular part is disposed closer to the first region than the second irregular part,
wherein the insulating layer comprises:
  a first layer disposed on the storage capacitive line;
  a second layer disposed on the first layer; and
  a third layer disposed on the second layer,
wherein, in the first region, the pixel electrode is disposed directly on the first layer or directly on the second layer, and
wherein the pixel electrode is disposed on the third layer in the second region.

2. The liquid crystal display device of claim 1, wherein the domain forming member comprises a domain forming member of the common electrode.

3. The liquid crystal display device of claim 2, wherein:
the domain forming member of the common electrode comprises a first sub domain forming member and a second sub domain forming member; and
the first sub domain forming member and the second sub domain forming member meet at a cross point within the first region and extend in different directions.

4. The liquid crystal display device of claim 3, wherein one of the first sub domain forming member and the second sub domain forming member connects the cross point to the first irregular part, and a length of the one first sub domain forming member and the second sub domain forming member in the first region is larger than a length of the one of the first sub domain forming member and the second sub domain forming member from a boundary between the first region and the second region to the first irregular part.

5. The liquid crystal display device of claim 3, wherein one of the first sub domain forming member and the second sub domain forming member connects the cross point to the first irregular part, and a width of the one of the first sub domain forming member and the second sub domain forming member is constant from the cross point to the first irregular part.

6. The liquid crystal display device of claim 3, wherein each of the first sub domain forming member and the second sub domain forming member of the common electrode in the first region is formed with a single irregular part.

7. The liquid crystal display device of claim 3, wherein:
the domain forming member further comprises a third sub domain forming member of the common electrode; and
the third sub domain forming member meets the first sub domain forming member and the second sub domain forming member at the cross point.

8. The liquid crystal display device of claim 7, wherein:
the storage capacitive line is elongated; and
the first sub domain forming member and the second sub domain forming member are symmetric to each other around the storage capacitive line.

9. The liquid crystal display device of claim 8, wherein the third sub domain forming member is elongated and parallel to the storage capacitive line.

10. The liquid crystal display device of claim 2, wherein:
the domain forming member comprises a plurality of domain forming members of the pixel electrode; and
at least one of the domain forming members of the pixel electrode is formed with a third irregular part having an enlarged width.

11. The liquid crystal display device of claim 2, wherein the domain forming member comprises a plurality of domain forming members of the pixel electrode,
at least one of the domain forming members of the pixel electrode is formed with a third irregular part having an enlarged width and a fourth irregular part having a reduced width, and
the third irregular part and the fourth irregular part are alternatively disposed.

12. The liquid crystal display device of claim 2, wherein the domain forming member comprises a plurality of domain forming members of the pixel electrode, at least one of the domain forming members of the pixel electrode is formed with a third irregular part having an enlarged width, and at least one of the domain forming members of the pixel electrode has uniform width.

13. The liquid crystal display device of claim 1, wherein the storage capacitive line is an elongated line crossing over a middle portion of the pixel electrode and extending parallel with a gate line.

14. The liquid crystal display device of claim 13, wherein the insulating layer comprises an inorganic layer and an organic layer, the inorganic layer being situated below the organic layer.

15. The liquid crystal display device of claim 14, wherein the organic layer is thinnest at a portion corresponding to the storage capacitive line.

16. The liquid crystal display device of claim 15, wherein the pixel electrode contacts the inorganic layer on the storage capacitive line.

17. The liquid crystal display device of claim 1, wherein the first substrate further comprises a gate line, a data line, and a thin film transistor connected to the gate line and the data line, the thin film transistor comprising:
a gate electrode;
a semiconductor layer and an ohmic contact layer disposed on the gate electrode; and
a source electrode and a drain electrode disposed at least partially on the ohmic contact layer and spaced apart from each other, and
wherein a data wiring comprising the data line, the source electrode, and the drain electrode overlaps the ohmic contact layer.

18. The liquid crystal display device of claim 1, wherein the domain forming member comprises a protrusion.

19. The liquid crystal display device of claim 1, wherein the liquid crystal layer has a vertically aligned (VA) mode.

20. The liquid crystal display device of claim 1, wherein:
the domain forming member comprises a domain forming member of the common electrode, wherein the domain forming member of the common electrode comprises a first sub domain forming member and a second sub domain forming member;
the first sub domain forming member and the second domain forming member meet at a cross point within the first region and extend in different directions; and
the first irregular part and the second irregular part are alternately disposed in each of the first sub domain forming member and the second sub domain forming member.

21. The liquid crystal display device of claim 1, wherein the first substrate further comprises a gate line, a data line, and a thin film transistor connected to the gate line and the data line, the thin film transistor comprising a drain electrode electrically connected to the pixel electrode via a contact hole, the contact hole being disposed outside the first region.

22. A liquid crystal display device, comprising:
a first substrate comprising:
a pixel electrode;
a storage capacitive line; and
an insulating layer disposed between the storage capacitive line and the pixel electrode, a top surface of the insulating layer having a first height in a first region situated above the storage capacitive line and a second height in a second region adjacent to the first region, the first height being lower than the second height;
a second substrate that faces the first substrate, the second substrate comprising a common electrode; and
a liquid crystal layer disposed between the first substrate and the second substrate, the liquid crystal layer comprising a vertically aligned (VA) mode,
the common electrode comprising a domain forming member disposed in the first region and the second region,
wherein a gap between the first substrate and the second substrate in the first region is different from a gap between the first substrate and the second substrate in the second region,
wherein the domain forming member of the common electrode comprises irregular parts, the irregular parts comprising:
a first irregular part comprising a greater width than a width of the domain forming member; and
a second irregular part comprising a smaller width than a width of the domain forming member,
wherein the first irregular part and the second irregular part are alternately disposed in the second region,
wherein the first irregular part is disposed closer to the first region than the second irregular part,
wherein the first region overlaps the storage capacitive line,
wherein a gap between the first substrate and the second substrate in the first region is thicker than a gap between the first substrate and the second substrate in the second region,
wherein the insulating layer comprises:
a first layer disposed on the storage capacitive line;
a second layer disposed on the first layer; and
a third layer disposed on the second layer,
wherein, in the first region, the pixel electrode is disposed directly on the first layer or directly on the second layer, and
wherein the pixel electrode is disposed on the third layer in the second region.

23. The liquid crystal display device of claim 22, wherein:
the domain forming member of the common electrode comprises a first sub domain forming member and a second sub domain forming member; and
the first sub domain forming member and the second sub domain forming member meet at a cross point within the first region and extend in different directions.

24. The liquid crystal display device of claim 23, wherein one of the first sub domain forming member and the second sub domain forming member connects the cross point to the first irregular part, and a width of the sub common electrode domain forming member is constant from the cross point to the first irregular part.

25. The liquid crystal display device of claim 23, wherein each of the first sub common electrode cutting pattern and the second sub common electrode cutting pattern in the first region is formed of a single irregular part.

26. The liquid crystal display device of claim 23, wherein the common electrode cutting pattern further comprises a third sub common electrode cutting pattern, and the third sub common electrode cutting pattern meets the first sub common electrode cutting pattern and the second sub common electrode cutting pattern in the cross point.

* * * * *